United States Patent [19]
Pavur et al.

[11] Patent Number: 5,702,133
[45] Date of Patent: Dec. 30, 1997

[54] UNIVERSAL SNAP-IN METAL PLUG

[75] Inventors: Carol P. Pavur, Warren; Dennis Harper, Romulus; Steven W. Bonnell, Macomb Township, all of Mich.; James F. Norkus, Waterbury; William F. Hartery, Watertown, both of Conn.; Lawrence W. Galloway, Elgin, Ill.

[73] Assignee: Chrysler Corporation, Auburn Hills, Mich.

[21] Appl. No.: 617,250

[22] Filed: Mar. 18, 1996

[51] Int. Cl.$^6$ ...................................... E05C 19/06
[52] U.S. Cl. ................. 292/80; 220/789; 220/795
[58] Field of Search .......................... 220/323, 789, 220/795, 787, DIG. 19, 378; 292/80

[56] References Cited

U.S. PATENT DOCUMENTS

| | | | |
|---|---|---|---|
| 2,816,687 | 12/1957 | Phillips | 220/793 |
| 3,018,535 | 1/1962 | Griffin | 24/213 |
| 3,072,287 | 1/1963 | Sampson . | |
| 3,182,119 | 5/1965 | Millard | 174/151 |
| 3,182,120 | 5/1965 | Duhn | 174/151 |
| 3,343,712 | 9/1967 | Lentz | 220/323 |
| 3,352,447 | 11/1967 | Hahn | 220/323 |
| 3,654,382 | 4/1972 | Rubright | 174/153 G |
| 3,944,107 | 3/1976 | Wallace | 220/326 |
| 3,990,604 | 11/1976 | Barnett | 220/307 |
| 4,041,241 | 8/1977 | Olmstead et al. | 174/153 G |
| 4,091,962 | 5/1978 | Buren | 220/326 |
| 4,363,420 | 12/1982 | Andrews | 220/307 |
| 4,391,384 | 7/1983 | Moore | 220/359 |
| 4,463,870 | 8/1984 | Coburn | 220/787 |
| 4,560,083 | 12/1985 | Danico | 220/795 |
| 4,588,104 | 5/1986 | Danico | 220/326 |
| 5,505,324 | 4/1996 | Danico | 220/787 |
| 5,558,346 | 9/1996 | Hartery | 220/307 |

Primary Examiner—Steven N. Meyers
Assistant Examiner—Gary Estremsky

[57] ABSTRACT

An improved snap-in metal plug for closing either a flat or flanged opening in a sheet metal panel or the like. The plug, in one embodiment, includes a circular disc formed with three co-planar tongues extending radially outwardly from the plug principal axis, with each tongue disposed about a radial center line of symmetry. Each tongue terminates in a radially outer fold line, disposed normal to its associated center line, formed by an underlying reverse folded ply. The ply terminates in a radially inner right angle bend juncture from which projects a single downstanding finger defining opposite vertical side edges. Each side edge has an upper tang struck outwardly and upwardly therefrom defining an upper tang free end. Upon the plug being seated in a flat opening, each upper tang has its upper end locked, in a snap-in manner, juxtaposed the panel interior surface. A lower prong, struck outwardly and upwardly from each finger and symmetrically disposed about a radial plane of symmetry, includes its associated tongue center line. Upon the plug being seated in the panel flanged opening, each finger has its upper tang biased into contact with the flanged opening interior wall, and whereby each lower tang upper free end is locked, in a snap-in manner, juxtaposed the downstanding flange under-edge.

1 Claim, 5 Drawing Sheets

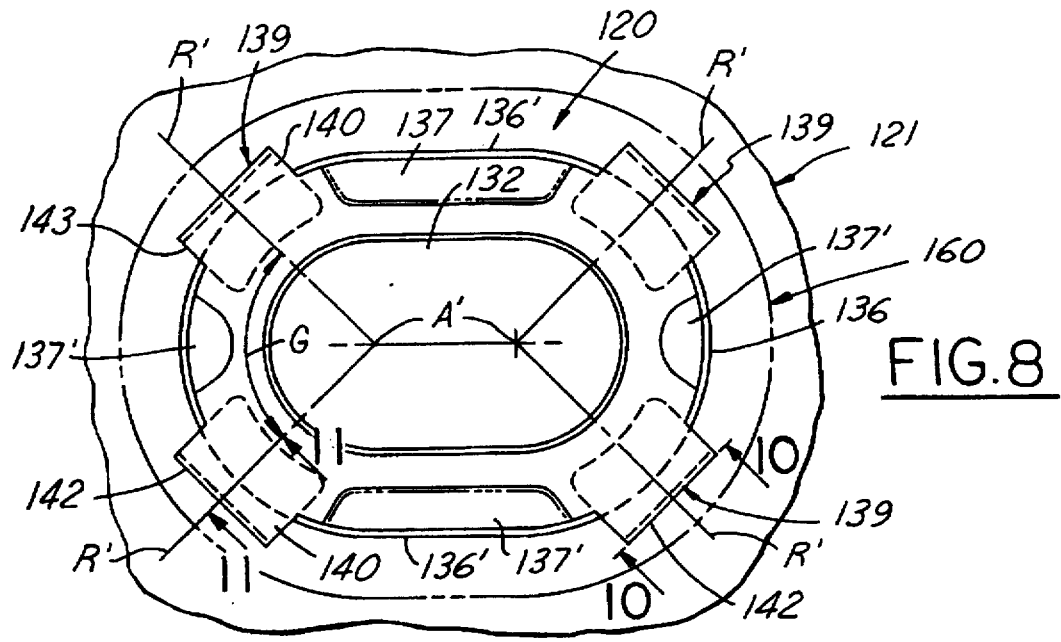
FIG.8
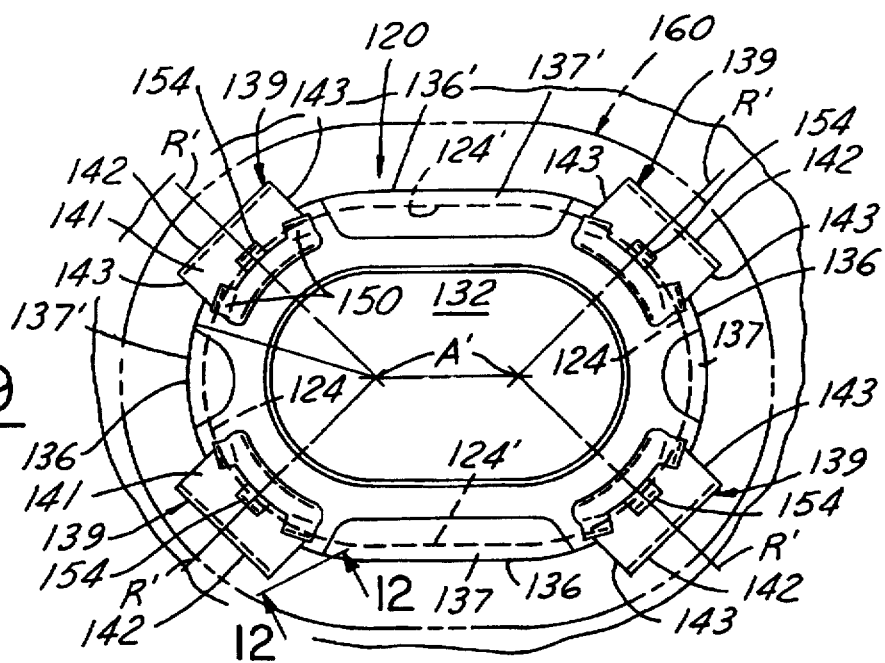
FIG.9
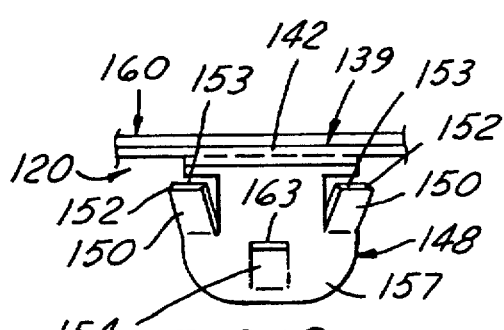
FIG.10
FIG.11

5,702,133

UNIVERSAL SNAP-IN METAL PLUG

FIELD OF THE INVENTION

This invention relates generally to closure covers and, more particularly, to universal flush type plugs adapted for closing a panel aperture such as body panel of a motor vehicle.

BACKGROUND OF THE INVENTION

A known snap-in metal plug is depicted in prior art FIGS. 17-19A wherein numeral 20' generally indicates a snap-in metal plug for a panel 21', having upper 22' and lower 23' surfaces, provided with a flat or un-flanged opening 24'. The plug is formed with a central concentrically disposed depressed disc 32' surrounded by an upper peripheral surface 34'. The plug peripheral circular edge is defined by three semicircular edge portions 36' separated by three uniformly spaced outwardly radiating tongues, generally indicated at 39'. The plug diameter D' exceeds the diameter of panel opening 24' by a predetermined dimension, as seen in FIG. 18. Each tongue 39' includes a flange extension 40' and an underlying ply 41' return bent about a fold line 42' disposed normal to its associated radial centerline R'.

Each tongue subjacent ply 41' inner terminus is defined by a pair of arcuate ninety degree bends 44' concentrically disposed about the plug principal axis A'. Each tongue bend 44' defines the upper proximate end of a pair of downstanding fingers 46', with each finger 46' located on one side of their associated tongue radial centerline R'. Each pair of fingers 46' define a first outer opposite pair of mirror image vertical edges 48' and a second opposed pair of vertical edges 49'. Each finger vertical edge 48' has a resilient upper tang 50' struck therefrom which diverges upwardly and outwardly, at a small acute angle from the plug axis A', terminating in an upper free locking edge 52'. Thus, upon the six fingers 46' being urged inward into the opening 24' each finger upper tongue is flexed inwardly such that its upper free edge 52' is juxtaposed an opposed undersurface of the plug upon being snapped into the panel opening.

As seen in FIG. 19, each finger opposed edge 49' has a resilient lower tang 54' struck therefrom, providing an upper end 56', wherein the tang 54' diverges upwardly and outwardly away from the axis A'. Each finger lower distal end has a downwardly and inwardly contoured shape providing a bulbous lead-in contact surface 55'. It will be seen that each pair of fingers 46' has the lower ends of their opposite edges 48' each terminating in a large radiused corner juncture 58' while each pair of opposed corners 59' is a near right angle. The upper tangs 50' are initially forced through the panel opening 24', after which the tangs 50' resiliently return to their normal position in a snap-in manner with each tang free edge 52' juxtaposed the panel undersurface 57', thereby providing locked retention of the plug. An upper circular elastomeric seal pad 60 is shown concentrically secured to the plug 20' by having its under surface heat-staked to the plug disc upper surface.

Referring to FIG. 19A, the plug 20' is shown with a panel 25', having upper 26' and lower 27' surfaces, provided with a flanged opening 28' defined by downstanding flange 29'. It will be seen that the plug is lockingly retained in the flanged opening 28' by virtue of lower prong upper end 56' being positioned juxtaposed panel flange lower edge 64' while the upper tangs 50' are resiliently biased into contact with the flanged opening 28'. As a seal pad 66' is secured to the undersurface of the plug depressed disc 32', it will be noted that the plug fingers 46' have an extended length to accommodate the seal pad 66'.

SUMMARY OF THE INVENTION

Accordingly, it is a feature of the present invention to provide an improved snap-in metal plug for closing a panel aperture having the versatility to be used with either a flanged or a flat panel aperture.

It is another feature of the present invention to provide a snap-in sheet metal plug adapted to seal apertures in vehicle panels defining sloped, upstanding, or overhead surfaces.

It is still another feature of the present invention to provide a snap-in metal plug formed from sheet metal having a plurality of lead-in resilient prongs enabling an installer to urge the plug into its associated aperture in a self-centering manner presenting a substantially planar top end to which the installer applies pressure.

It is yet another feature of the present invention to provide a snap-in metal plug adapted for closing flanged panel apertures which are unevenly or partially flanged or flat panel holes which are out-of-round or otherwise distorted either from tooling, build variations, or extended use.

It is a further feature of the present invention to provide a novel snap-in metal plug formed from sheet metal incorporating an elastomeric seal pad for sealing the panel opening closed by the plug.

It is a still further feature of the present invention to provide a snap-in metal plug as set forth above wherein peripheral sealing may be accomplished by means of a heat-staked top seal pad positioned on the upper planar surface of the plug, a bottom heat expandable seal pad fixed to the undersurface of the plug, or an elastomeric seal pad positioned between a metal pressure plate and a metal plug.

These and other features and advantages of the invention will be evident from the following detailed description of the invention and the accompanying drawings wherein:

BRIEF DESCRIPTION OF THE DRAWINGS

FIG. 8 is a fragmentary top view of another embodiment of the present invention received in a panel flat elongated oval-like opening;

FIG. 9 is a fragmentary bottom view of the plug of FIG. 8;

FIG. 10 is an enlarged fragmentary side view taken on the line 10—10 of FIG. 8;

FIG. 11 is a fragmentary vertical sectional view taken on the line 11—11 of FIG. 8;

DETAILED DESCRIPTION OF THE INVENTION

Figure 1:
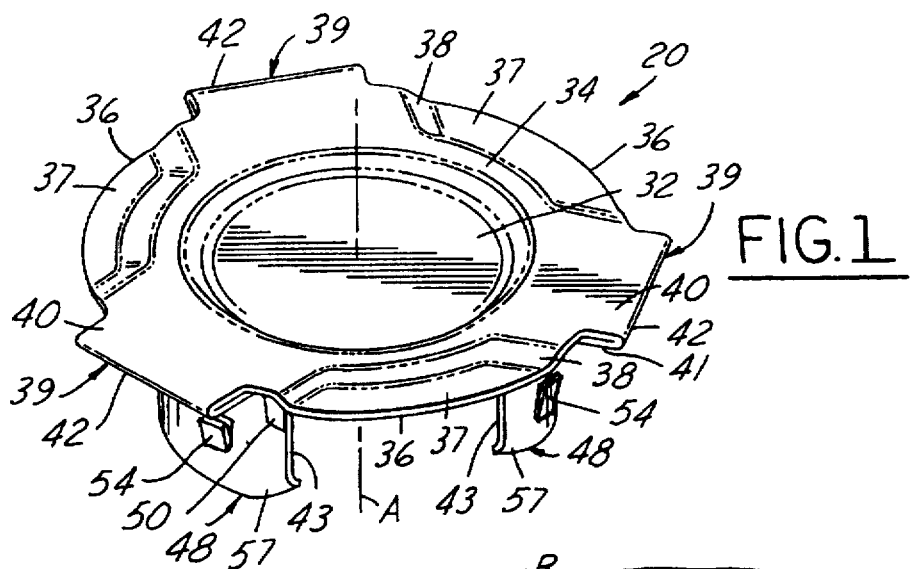
FIG. 1 is a perspective view of a plug of the instant invention adapted for closing flat or flanged circular panel openings.
Figure 2:
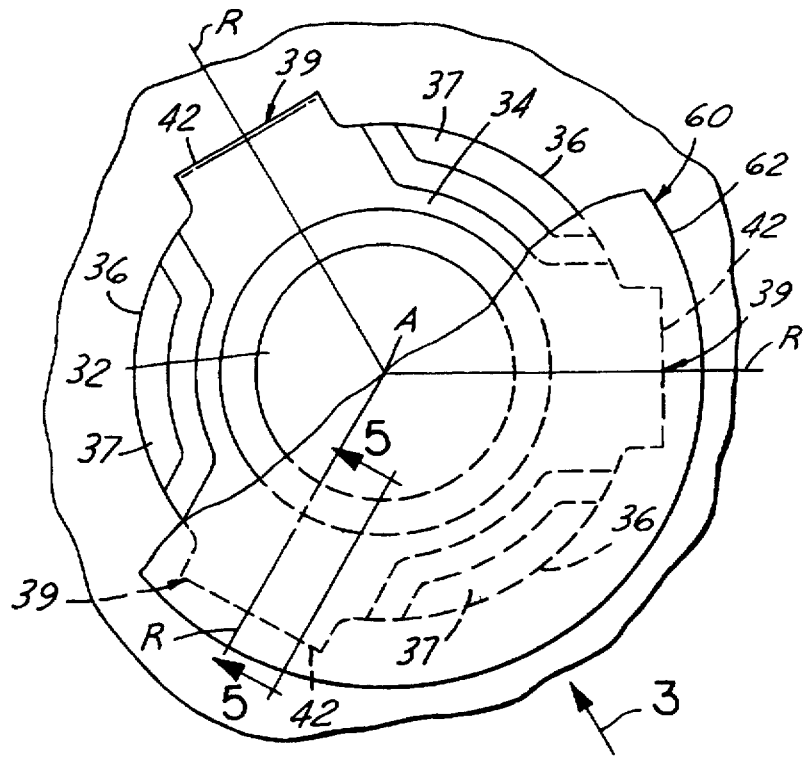
FIG. 2 is fragmentary a top view, with parts broken away, of the FIG. 1 plug shown received in a panel flat opening.
Figure 3:
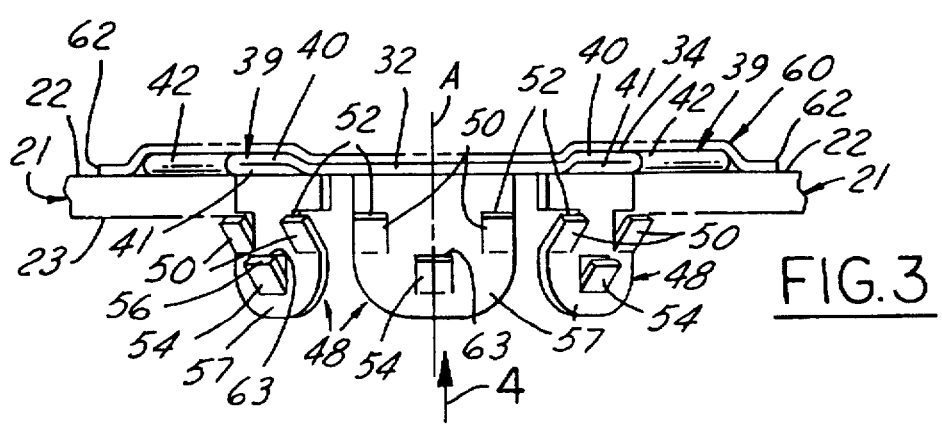
FIG. 3 is a fragmentary side elevation view taken in the direction of the arrow denoted by the numeral "3" in FIG. 2.
Figure 6:
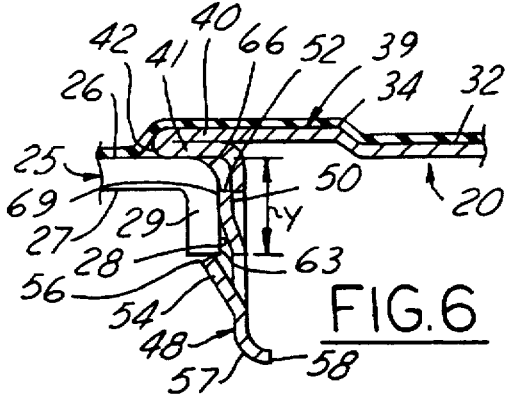
FIG. 6 is an enlarged fragmentary vertical sectional view, similar to FIG. 5, showing the plug of FIG. 1 received in a panel flanged circular opening.

Referring now to the drawings in detail, in FIGS. 1 and 2 numeral 20 generally indicates a snap-in plug according to a first embodiment of the present invention. The plug is formed from sheet metal, preferably galvanized steel, as a one-piece substantially circular-shaped plug having a principal axis A. In FIG. 3 a metal panel 21, defining an exterior or upper surface 22 and an under surface 23, has a circular flat opening, shown at 24 in FIG. 4. The panel opening 24 has a predetermined diameter D, with the opening being closed by the snap-in insertion of the plug 20. FIG. 6 depicts a sheet metal panel 25, having an upper surface 26 and an under surface 27, provided with a flanged circular opening, defined by a cylindrical interior wall 28, having the same diameter as the flat circular opening 24. The flanged opening interior cylindrical wall 28 is formed by an annular downstanding flange 29, concentrically disposed about the flanged opening principal axis.

Referring to FIGS. 1, 2, and 3, the plug 20 includes a concentrically disposed circular disc 32 having its upper surface downwardly off-set from the plug surrounding peripheral surface 34. It will be seen in FIG. 2 that the plug upper peripheral surface 34 is divided into three arcuate edge sections or outer free edges 36. The peripheral edges 36, shown in FIG. 4, have a common center of curvature located on axis A and extend a predetermined dimension beyond the panel opening 24.

Figure 4:
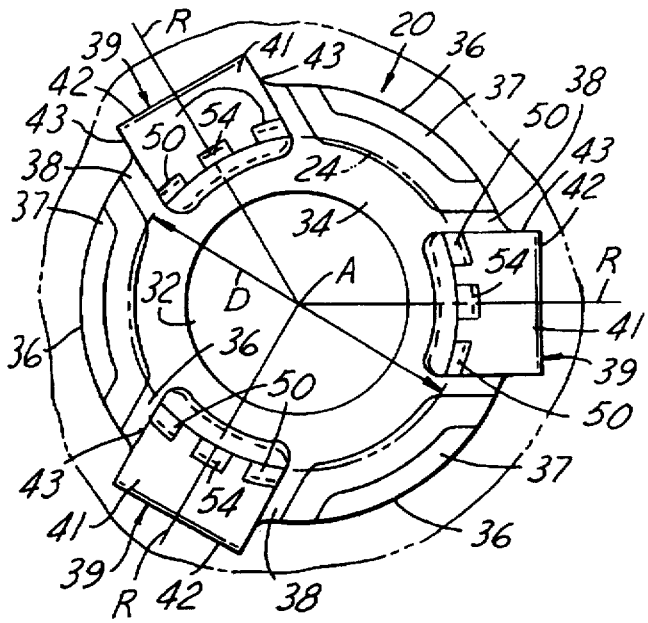
FIG. 4 is a fragmentary bottom plan view taken in the direction of the arrow denoted by the numeral "4" in FIG. 3.

The plug upper surface 34 is formed with three downwardly offset arcuate sectors 37 the undersurfaces of which are adapted for flush contact with the opposed panel exterior surface 22. As seen in FIGS. 1 and 4, the offset sectors 37 establish six gap areas 38 with the panel upper surface 22, defined between the ends of each sector 37 and adjacent tongue portions described below.

Referring to FIG. 2, the plug three arcuate edges 36 are separated by three uniformly spaced outwardly radiating tongues, generally indicated at 39. It will be noted that each tongue 39 includes a radially outwardly extending flange portion 40 and an underlying inwardly folded ply 41, formed by a reverse bend about tangential fold-line 42. Each tongue 39 is shown symmetrically disposed about an associated radial centerline R with its fold-line 42 oriented normal to the centerline R. Thus, each tongue 39 includes an overlying upper flange portion 40 and a subjacent ply 41 in flush face-to-face contact. It will be noted that each tongue fold line 42 is located a predetermined radial dimension outward from the panel opening 24 overlying the panel upper surface 22.

Figure 5:
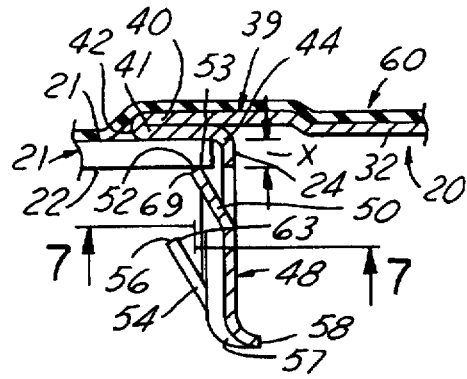
FIG. 5 is an enlarged fragmentary vertical sectional view taken on the line 5—5 of FIG. 2.
Figure 7:
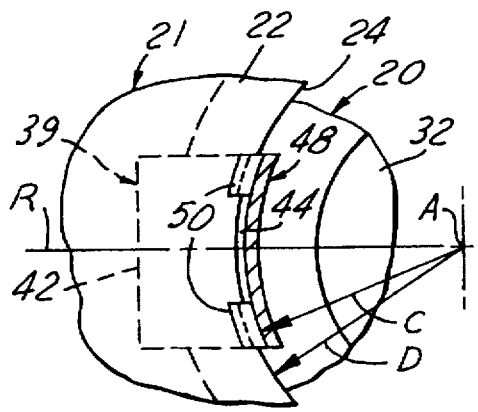
FIG. 7 is a fragmentary horizontal sectional view taken once line 7—7 of FIG. 5.

The plug underside, as viewed in FIG. 4, shows each tongue flange portion 40 and its underlying ply 41 being defined in part by a pair of common side edges 43 disposed parallel to their associated tongue radial plane of symmetry, which includes its centerline R. In FIG. 5 it will be noted that each ply 41 has a radially inner terminus, defined by a ninety degree bend juncture 44 having an arcuate shape, as viewed in FIG. 7. Each arcuate bend juncture 44 is concentrically disposed about plug axis A, with the bend juncture 44 symmetric about its associated radial centerline R. The three arcuate bend junctures 44 define an imaginary circle having a predetermined diameter, substantially equal to, but slightly less than, the diameter D of the panel circular opening 24.

As viewed in FIG. 5, each tongue arcuate bend juncture 44 defines an upper or proximate end of an axially downwardly extending plug finger 48, disposed about a vertical plane of symmetry that includes its associated radial line of symmetry R. In FIG. 4 the exterior surface of each of the plug three uniformly spaced, axially extending fingers 48 define an imaginary right-cylinder, concentrically disposed about the plug axis A.

With reference to FIG. 3, each finger 48 has an opposite pair of vertically extending edges 49 with each edge 49 providing a resilient upper or proximate resilient edge tang 50 struck therefrom. Each edge tang 50 diverges radially upward and outward from plug axis A at a predetermined acute angle in the direction of its upper free end 52.

As seen in FIG. 3, each finger 48 includes a resilient lower or distal central tang 54 which diverges upwardly and outwardly away from the plug axis A, thereby extending in the direction of its upper free end 56 at a predetermined acute angle relative to the axis A. It will be observed in FIG. 5 that each finger 48 has its lower distal end formed with a convex outward exterior bulbous surface 57 terminating in an inwardly radiused free end 58. Thus, upon the fingers 48 being inserted into the panel opening 24, the convex surfaces 57 are engaged by the panel opening 24 causing each resilient lower tang 54 to be initially conjointly cammed radially inwardly, in a self-centering lead-in manner, for passage through the opening. Thereafter, each lower tang 50 resiliently returns to its design position.

In FIG. 5 each upper tang line edge 53 is shown spaced a predetermined axial dimension X from an underside of its associated ply 41. It will be noted that the dimension X is slightly greater than the nominal thickness of the panel 21, thereby providing a dimensional allowance to accommodate small panel distortions, tolerance variations of one or more of the fingers 48, etc. Upon the plug 20 being seated in panel opening 24, each upper tang edge 53 is positioned juxtaposed the panel under surface 23, thereby insuring locked retention of the plug in the panel opening 24, while allowing slight vertical play relative to the panel.

The plug 20 is shown in FIGS. 2 and 5 including a flexible circular upper seal pad 60, formed of suitable plastic or elastomeric sheet material of predetermined thickness and flexibility. The pad 60, which overlies the plug upper surface in a concentric manner, is suitably secured as by heat-staking to a central portion of the underlying plug disc 32. As seen in FIG. 2, the pad 60 has a diameter such that its concentric free edge 62 is located radially outwardly a predetermined dimension beyond the tongue fold lines 42, establishing flush face-to-face contact of the pad underside with the panel upper surrounding surface 22, thereby sealing the opening 24 against the passage of air and moisture.

With reference to FIG. 6, the plug 20 is shown received in the circular flanged opening 28 of a panel 26. Each of the three finger lower locking prongs 54 has an upper edge 63 of its free end 56, adapted for juxtaposed positioning with free lower end 64 of panel downstanding flange 29. In the same manner as the flat panel opening discussed above, the undersurface of each plug ply 41 is spaced a predetermined dimension Y providing a tolerance slightly greater than the nominal vertical space between the undersurface of tongue ply 41 and the free end 64 of the panel downstanding flange 29. In the same manner as with the panel flat opening 24, the tolerance dimension Y accommodates small deviations in the height of the downstanding flange 29, length of the plug fingers, etc.

It will be seen in FIG. 6 that the flanged opening 28 provides a radiused lead-in bend 66. Upon the plug 20 being pushed into the flanged opening 28, each of the three central lower flexible tangs 54 is initially cammed radially inwardly. As the lower tangs 54 are symmetrically aligned on an associated tongue centerline R, each lower tang 54 is initially flexed radially inwardly, in a self-centering manner, by the lean-in bend 66. Thereafter, as additional downward force is applied to the plug 20, the flanged opening 28 continues to bias the three lower tangs 54 and the six upper tangs 50 radially inwardly.

Upon the lower tangs 54 being inserted below the downstanding flange underside circular edge 64, each lower tang resiliently snaps-back to its design position, whereby its upper line edge 63 is positioned juxtaposed the flange end 64, thereby locking the plug in the flanged opening 28. It will be noted in FIG. 6 that the installed plug has its six upper tangs 50 biased radially inwardly by the flange cylindrical interior wall defining the opening 29, resulting in each upper tang outer line edge 69 being urged into frictional engagement therewith.

Figure 14:
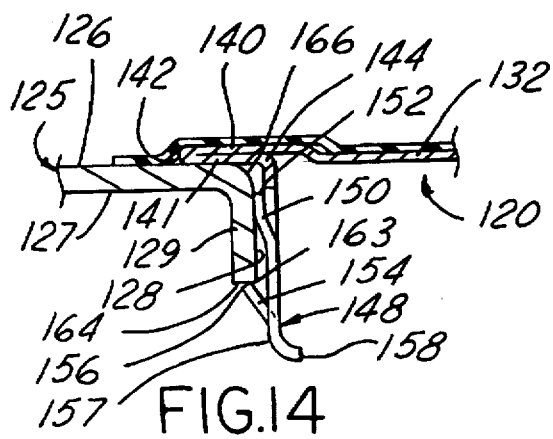
FIG. 14 is a view similar to FIG. 11 showing the FIG. 8 elongated plug received in a panel flanged elongated opening.

Turning now to a second embodiment of the present invention, depicted in FIGS. 8–14, wherein the same or similar elements have the same reference numerals as the first embodiment, except that the numerals are increased by 100. As seen in FIGS. 8 and 11, an elongated plug 120 is shown closing a flat oval-like or elongated opening in panel 121 having upper 122 and lower 123 planar surfaces. The elongated panel opening is defined by opposed half-round edges 124 joined by parallel side edges 124'. FIG. 14 shows a panel 125 with upper 126 and lower 127 planar surfaces and a generally oval-like or elongated flanged opening 128, formed with a continuous downstanding flange 129, closed by the elongated plug 120.

Referring to FIGS. 8 and 9, the one-piece elongated plug 120, preferably formed from sheet steel, includes a central elongated disc 132, having a depressed surface downwardly off-set from plug upper surface 134. The plug 120 has its outer periphery defined by an opposite pair of half-circle end edges 136 joined by parallel side edges 136'. The elongated plug outer edge is shown in FIG. 9 conforming to, but extending outwardly from, the panel flat elongated opening 124 by a predetermined uniform dimension.

With reference to FIG. 8, the plug 120 upper surface 134 is formed with a pair of downwardly offset elongated side sectors 137', and a pair of downwardly offset laterally opposed end sectors 137. Each sector lower surface is adapted for flush contact with the panel upper surface 122. The pair of end sectors 137 and the pair of side sectors 137' partially define eight gap areas 138 between their ends and adjacent plug tongues, described below.

The plug opposite half-circle end edges 136 each has a radius of curvature with a center located on an associated one of a pair of vertical axes A'. Each half-circle portion is formed with a pair of identical outwardly extending tongues 139, with each tongue is symmetrically disposed about an associated radial centerline of symmetry R'. It will be noted that each half-circle pair of tongue center lines R' define a ninety degree included angle G therebetween.

Each tongue 139 comprises an upper flange portion 140 and an underling juxtaposed ply 141, formed by a reverse bend about fold line 142 oriented normal to its centerline R'. As seen in FIG. 9, each fold line 142, which overlies the panel upper surface 122, is located a predetermined radial dimension outwardly from its associated elongated opening half-round edge 124.

As seen in FIG. 9, each tongue flange portion 140 and its underlying ply 141 are partly defined by a pair of common side edges 143 disposed parallel to their associated centerline R'. FIG. 11 shows each ply 141 formed with a radially inner terminus, defined by a ninety degree bend juncture 144, having an arcuate shape as viewed in FIG. 13. Each arcuate bend juncture 144 is concentrically disposed about its associated plug axis A' and each tongue portion 140 is symmetrically disposed about its centerline R'.

Referring to FIG. 10, each finger ply 141 is formed with a downstanding finger 148, concentric about its associated axis A'. In FIG. 9 each of the plug four finger bend junctures 144 define an imaginary elongated envelope of predetermined size for reception in the elongated flat opening of panel 121.

Figure 12:
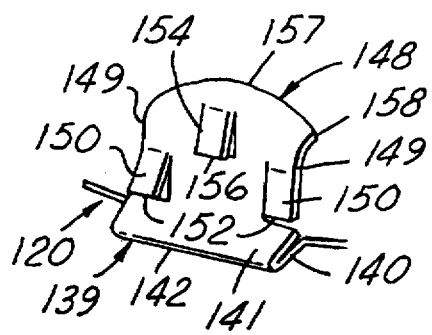
FIG. 12 is a fragmentary perspective side view taken on the line 12—12 of FIG. 9.
Figure 13:
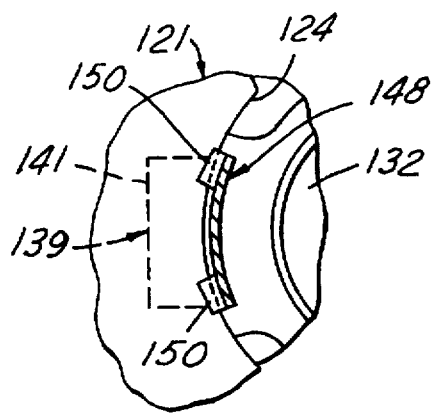
FIG. 13 is an enlarged fragmentary horizontal sectional view taken on the line 13—13 of FIG. 11.

With reference to FIG. 12, each finger 148 includes an opposite pair of vertically extending edges 149, having an upper or proximate end resilient tang 150 struck therefrom. FIG. 11 shows each tang 150 diverging radially outward and upward away from its associated axis A' in the direction of its upper free end 152. Each finger 148 has a lower or distal tang 154 struck therefrom which diverges radially outward and upward away from its associated plug axis A', in the direction of its upper free end 156 at a predetermined acute angle.

It will be seen in FIG. 11 that each finger 148 has its lower distal end formed with a convex outward bulbous-shaped surface 157 terminating in an inwardly and downwardly directed free end 158. Upon the four plug fingers 148 being initially inserted into the flat elongated opening 124, each of the bulbous-shaped surfaces 157 engage the peripheral edge of the opening. As additional force is exerted on the plug 120, its lower tangs 154 are conjointly cammed and radially flexed inwardly, in a smooth lead-in manner. Upon being seated in the elongated opening 124, the tangs 154 return or snap-back to their normal position.

FIG. 11 shows a tang 150 positioned with its inner line edge 153 spaced a predetermined axial dimension X' from an underside of its associated ply 141. It will be noted that panel 121 has a predetermined thickness substantially equal to, but slightly less than the dimension X'. Thus, with the plug 120 seated in the elongated opening, each upper tang edge 153 is juxtaposed the panel lower surface 123, thereby locking the plug in the panel opening 124.

The elongated plug 120 is shown in FIG. 11 including a flexible elastomeric top seal pad 160 overlying the plug upper surface in a conforming manner with the pad central portion secured, as by heat-staking, to the upper surface of the plug disc 132.

With reference to FIG. 14, the plug 120 is shown seated in elongated flanged opening 128 of panel 125. Each of the four lower prong upwardly directed ends 156 an upper line edge 163 juxtaposed opposed circular under side edge 164 of the panel downstanding flange 129. It will be noted that the flanged opening 128 is formed with a radiused lead-in bend 166. Upon the plug 120 being urged into the elongated flanged opening, the four lower flexible tangs 154 are initially cammed radially inwardly. As each lower tang 154 is symmetrically aligned on its associated centerline R', the four lower tangs 54' are flexed radially inwardly, in a smooth, self-centering manner, by the flanged opening bend 166. Upon additional seating force being applied to the plug 120, the flanged opening 128 interior wall continues to bias the four lower tangs 154 and the eight upper tangs 150 radially inwardly.

With the eight lower tangs 154 being inserted in the flanged opening 128 below the flange 129, each lower tang 154 snaps-back to its normal position, whereby its inner line edge 163 is located juxtaposed flange edge 164 locking the plug in the opening. In the same manner as discussed with respect to the circular plug 20, the upper tangs 150 are biased radially inwardly by the opposed flange interior wall, wherein each upper tang line edge 153 is urged into engagement therewith.

Figure 14A:
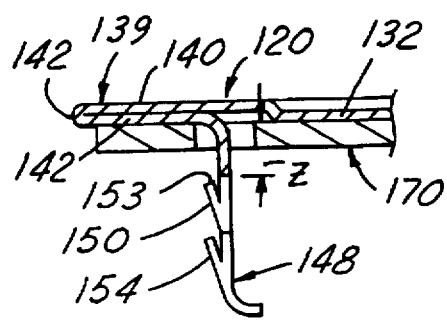
FIG. 14A is a view similar to FIG. 14 of the elongated plug provided with a bottom or interior seal pad.

In FIG. 14A embodiment the elongated plug 120 includes an elastomer seal pad 170 secured to an underside of the plug disc. In this arrangement, the upper tang 150 has its upper line edge 153 spaced a predetermined axial dimension Z between upper tang line edge 153 and an undersurface of ply 142. The dimension Z is substantially equal to but slightly greater than the combined nominal thicknesses of the panel 125 (not shown) and the pad 170.

Figure 16:
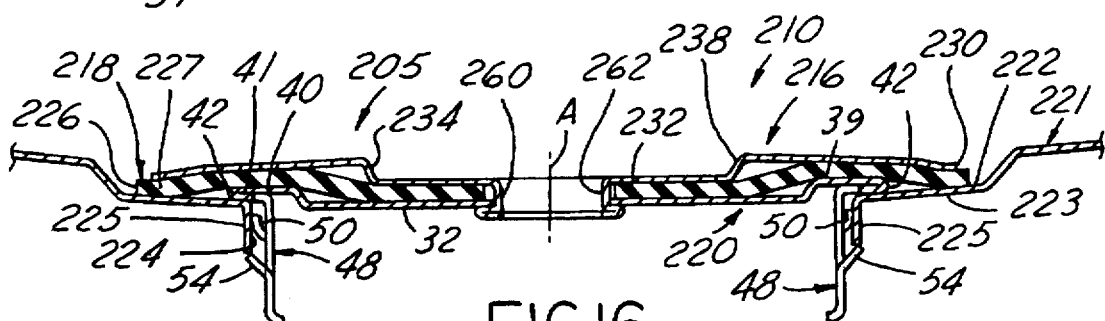
FIG. 16 is vertical cross sectional view taken on the line 16—16 of FIG. 15.
Figure 16A:
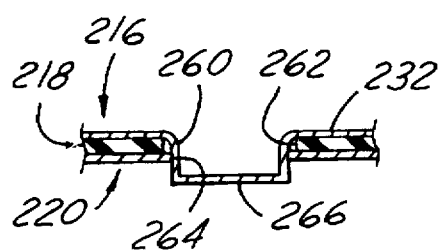
FIG. 16A is fragmentary cross sectional view of the composit plug assembly FIG. 15 showing the pressure plate central hub prior to being deformed.
Figure 15:
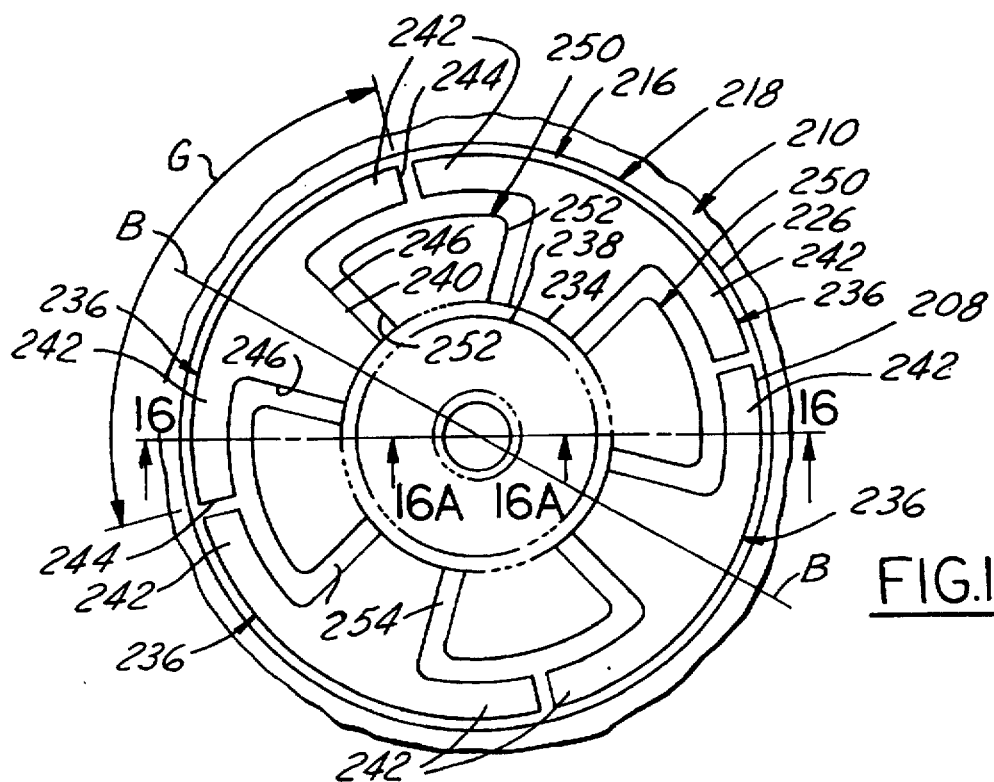
FIG. 15 is a fragmentary top view of another embodiment of the invention in the form of a composite circular snap-in plug assembly.
Figure 17:
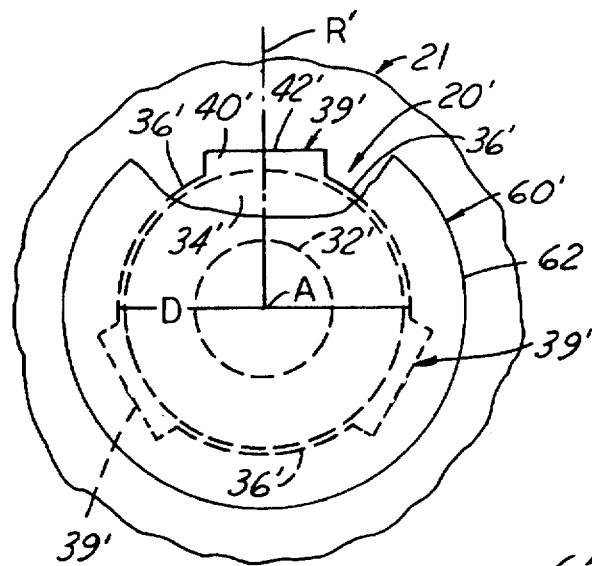
FIG. 17 is a fragmentary plan view of a panel exterior surface showing a circular metal plug and top seal pad, partially broken away, sealing a flat panel opening according to the prior art.
Figure 19A:
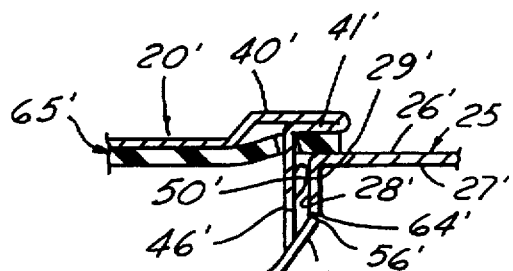
FIG. 19A is a fragmentary vertical cross sectional view, similar to FIG. 19, with a plug and bottom seal pad sealing a panel flanged hole according to the prior art.
Figure 18:
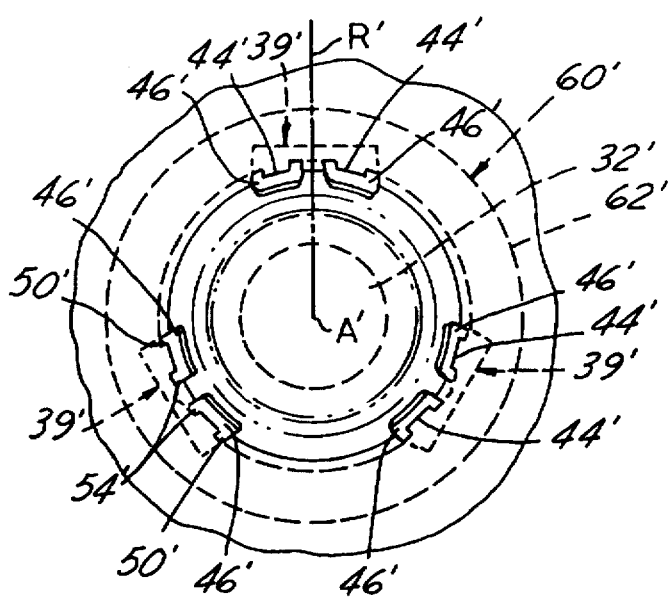
FIG. 18 is a fragmentary bottom plan view of the plug of FIG. 17.
Figure 19:
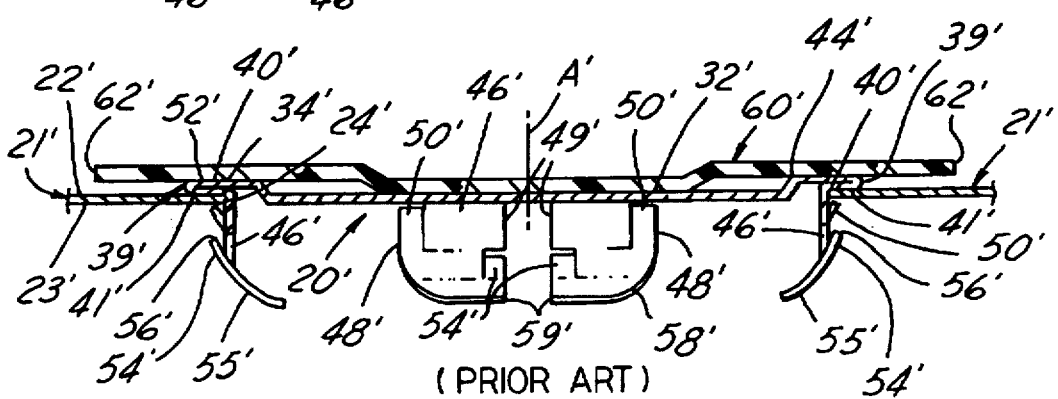
FIG. 19 is a fragmentary vertical cross sectional view taken on line 19—19 of FIG. 17.

Referring now to a third embodiment shown in FIGS. 15–16A, a composite sealing plug assembly, indicated generally at 210, includes a circular-shaped one piece pressure plate, 216, an intermediate sealing pad 218, and a one-piece plug 220. As the plug 220 is substantially the same as the plug of FIGS. 1–7, identical elements of plug 220 will have the same reference numerals as plug 20.

With reference to FIG. 16, a sheet metal panel 221, shaped with recessed circular portion defined by exterior surface 222 and interior surface 223, is shaped with a circular flanged opening 224 of predetermined diameter formed by a downstanding peripheral flange 225 closed by the snap-in sealing plug assembly 210. It will be noted that the plug assembly 210 is also adapted for closing a flat or un-flanged panel opening in the same manner as the previously described plugs. The sealing plug assembly 210 is particularly useful in situations requiring the sealing closure of openings formed in upstanding or overhead panels such as found, for example, in vehicle body panels.

As seen in FIG. 16, the pad 218, which has a diameter a predetermined dimension larger than the plug 220, is concentrically positioned over the plug's exterior surface. The pad 218 has a predetermined diameter such that the pad's outer edge 226 extends beyond the plug tongue portion fold lines 42 a predetermined dimension allowing resilient flexing of a peripheral portion 227 of the pad 218 to flex into flush sealing contact with panel exterior surface 222. It will be noted that the pressure plate perimeter is positioned a slight radial dimension inward from the pad outer edge 226.

With reference to FIG. 15, the pressure plate 210 has a spiderweb-like configuration defining an outer circular segmented edge 230 having a predetermined diameter slightly less than the diameter of the seal pad 218. FIG. 16 shows the pressure plate 216 formed with a central depressed hub 232 defined by an upwardly and radially outwardly sloped rim 234. FIG. 15 shows a plurality of annular spaced apart resilient, generally T-shaped pad supporting leaves, each indicated generally at 236, extend outwardly and slightly downwardly from the upper end 238 of the rim 234.

As seen in FIG. 15, each support leaf 236 includes a radial stem 240, having its inner proximal end joined to the hub rim upper edge 238, and its outer distal end terminating in a pair of opposite semicircular sector arms 242. It will be noted that each plate leaf 236 is symmetrically disposed about a radial axis "B" while each leaf pair of semi-circular arm 242 subtend a radial angle H, between each arm free end 244, of slightly less than ninety degrees, i.e. of the order of 89 degrees. It will be noted that each stem 240, which diverges outwardly from the hub upper edge 238, is defined by a pair of radially disposed stem side edges 246.

In the disclosed embodiment, the pressure plate 216 includes two pair of diametrically opposed, identical T-shaped leaves 236. It will be observed in FIG. 15 that each leaf 236, together with either one of its adjacent leaves, define therebetween a fan-shaped aperture which follows, in matching spaced relation, the profile of an inner resilient pad supporting fan-shaped pedal 250. Each pedal 250 defines a pair of pedal side edges 252 with each pedal side edge 252 substantially parallel to its opposed stem side edge 246. Thus, each plate fan-shaped aperture, together with its conforming inner pedal 250, define therebetween uniform radially extending pedal side bordering gaps 254 the outer ends of which are connected by an arcuate outer concentric gap 256. The four semi-circular arms 242 establish an outer segmented concentric ring, defining the plate outer circular segmented edge 208, adapted to resiliently bias the pad peripheral portion, adjacent pad outer edge 226, into flush sealing contact with the underlying panel upper surface 222.

Referring to FIG. 16, the pressure plate depressed hub 232 is shown draw-formed defining an inverted cylindrical-shaped mounting hub 260, concentrically disposed about the composite plug axis A. The central hub 260 is sized for securing the pressure plate 216 to the plug 220 after being snugly passed through central hole 262 in the pad and an aligned central hole 264 in the plug 216, whereby the hub is deformed. Upon a suitable stamping die upsetting hub closed end 266, an annular return flange is formed, indicated at 268 in FIG. 16. The return flange 268 interlocks the pressure plate hub 260 to the plug central disc 32 with the resultant capture of the seal pad 218 therebetween.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A composite snap-in plug adapted for closing either a panel flat circular opening or a panel flanged circular opening wherein the openings have the same diameter, and wherein the panel flange is downstanding from an exterior to an interior panel surface defining an interior cylindrical wall terminating in a circular under-edge, the composite plug comprising:

a circular elastomeric seal pad concentrically positioned between an exterior surface of an annular plug and an annular pressure plate, said plug formed with a circular edge interspersed with a plurality of tongue portions extending radially from the plug axis, each said tongue portion extending radially outward to a terminus defined by a fold line formed by a reversely folded ply, wherein said fold line is located at least slightly beyond said circular edge, each said ply having a radially inner terminus defined by a bend juncture terminating in a downstanding finger defining opposite vertically disposed side edges, each finger side edge having a resilient upper tang protruding radially outward and upward therefrom defining an upper tang free end, whereby said plug is locked in the panel flat opening upon each upper tang free end being positioned, in a snap-in manner, juxtaposed to the panel interior surface;

each said finger having a resilient lower tang protruding radially outward and upward therefrom defining an upper free end, each said finger lower tang symmetrically disposed about a radial plane of symmetry which includes its associated tongue center line, whereby said plug is locked in the panel flanged opening upon each said finger having its upper tangs urged into resiliently biased contact with the circular flange opening interior cylindrical wall, and whereby each said lower tang upper free end is positioned, in a snap-in manner, juxtaposed the circular under-edge of the flanged opening;

said plate being shaped with a concentric depressed wheel formed with a central hub portion securing said plate to said plug, after being passed through a pad central aperture and an aligned aperture in said plug, whereby said hub is deformed for engaging an interior surface of said plug;

said plate wheel terminating in an upstanding rim, a plurality of uniformly spaced resilient plate portions extending radially outwardly and downwardly from an upper circular edge of said rim, whereby each said plate portion retains a portion of said pad in sealing contact with a portion of said panel exterior surface surrounding said plug;

wherein certain of said plate portions are in the form of a generally T-shaped leafs symmetrically disposed about a radial line of symmetry intersecting said axis, each said T-shaped leaf defining a radial stem with its inner end joined to said rim upper edge and an outer end terminating in a semi-circular arm, whereby each said arm has an outer arcuate edge defining a portion of said plate peripheral edge;

wherein each said semi-circular arm subtends a predetermined radial angle between its radially disposed free arm ends, and wherein adjacent semi-circular arms define a radial gap area between their opposed arm ends;

wherein each said T-shaped leaf, together with a next adjacent T-shaped, leaf define therebetween a fan-shaped space, each said fan-shaped space following, in matching spaced relation, the profile of a fan-shaped pedal having an inner concentric free edge joined to said rim upper edge and an outer concentric free edge adapted to engage an intermediate portion of said pad, and wherein each said fan-shaped pedal and its associated fan-shaped space are symmetrically disposed about a radial line of symmetry which bisects an associated radial gap area; and wherein each said T-shaped leaf and fan-shaped pedal is sloped downwardly and outwardly from said rim upper edge, wherein said pressure plate defines a generally frusto-conical shaped surface.

\* \* \* \* \*